No. 839,266. PATENTED DEC. 25, 1906.
G. H. BROWNE.
AUTOMOBILE.
APPLICATION FILED MAR. 16, 1905.

2 SHEETS—SHEET 1.

Witnesses.
Inventor.
Gaylord H. Browne
By Benedict & Morsell
Attorneys.

No. 839,266. PATENTED DEC. 25, 1906.
G. H. BROWNE.
AUTOMOBILE.
APPLICATION FILED MAR. 16, 1905.

2 SHEETS—SHEET 2.

Witnesses.
C. H. Keeney
Anna F. Schmittbauer

Inventor.
Gaylord H. Browne
By Benedict & Morsell
Attorneys.

THE NORRIS PETERS CO., WASHINGTON, D. C.

UNITED STATES PATENT OFFICE.

GAYLORD H. BROWNE, OF CHICAGO, ILLINOIS, ASSIGNOR OF ONE-HALF TO CHARLES A. BAKER, OF MILWAUKEE, WISCONSIN.

AUTOMOBILE.

No. 839,266.

Specification of Letters Patent.

Patented Dec. 25, 1906.

Application filed March 16, 1905. Serial No. 250,351.

*To all whom it may concern:*

Be it known that I, GAYLORD H. BROWNE, residing in Chicago, in the county of Cook and State of Illinois, have invented new and useful Improvements in Automobiles, of which the following is a description, reference being had to the accompanying drawings, which are a part of this specification.

My improved automobile is intended for use by boys or children in their play, the operative mechanism being such as is especially adapted for that purpose; but it is not intended to confine the use of the automobile to the mere amusement of children, since it may be applied to or used for any purpose that it is adapted for.

The invention consists of the mechanism, its parts and combinations, as herein described and claimed, or the equivalents thereof.

Figure 1:
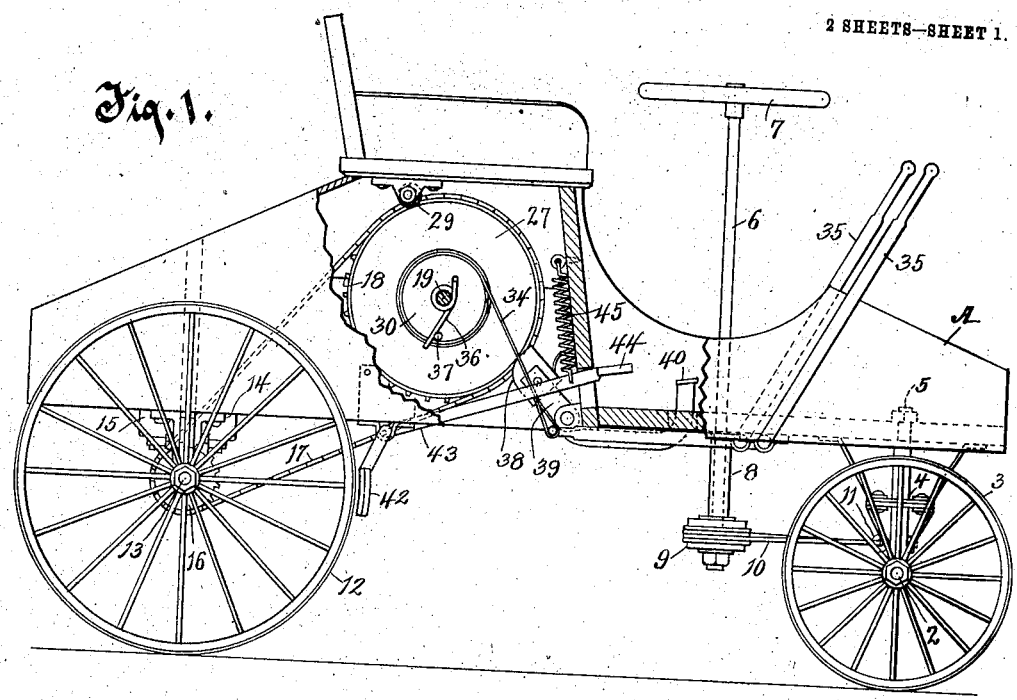
Figure 2:
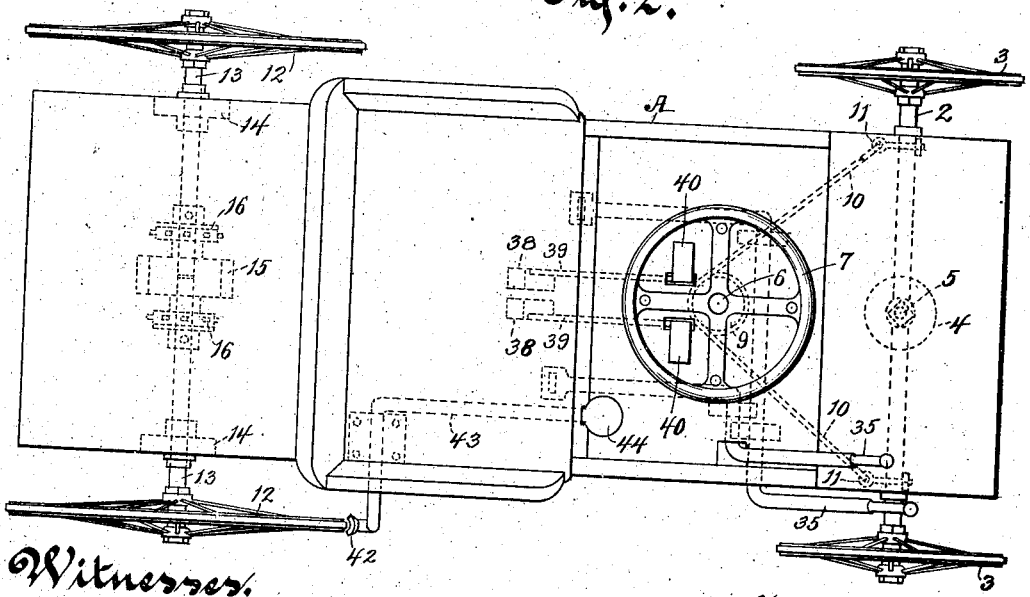
Figure 3:
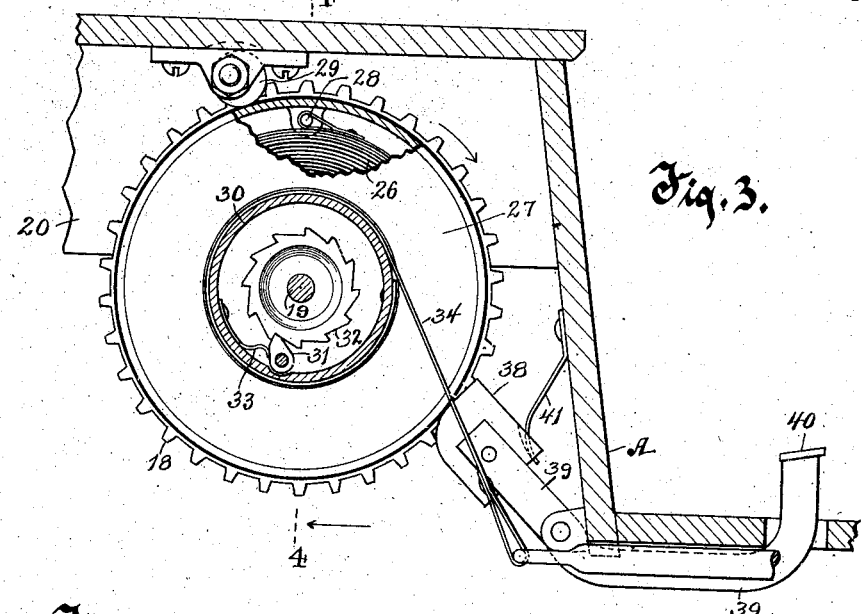
Figure 4:
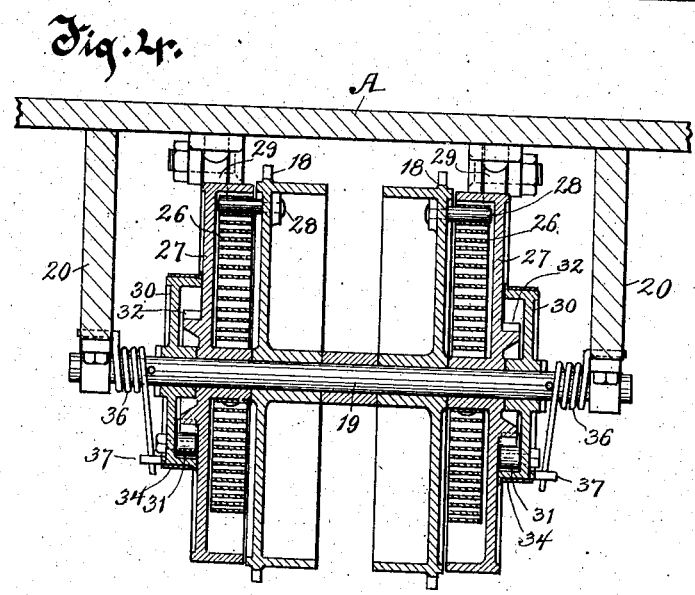
Figure 5:
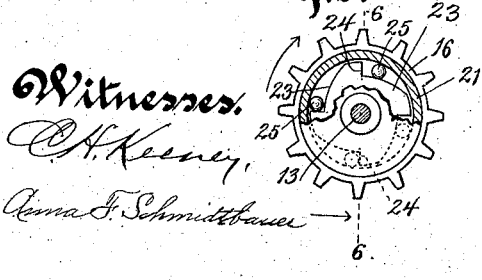
Figure 6:
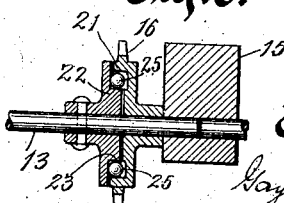

In the drawings, Figure 1 is a side elevation of an automobile embodying my improved mechanism, parts being broken away to show interior operative construction. Fig. 2 is a plan of the improved automobile. Fig. 3 illustrates details of the power-containing and driving mechanism with related devices. Fig. 4 is a cross-section of the mechanism shown in Fig. 3 on line 4 4 thereof. Figs. 5 and 6 illustrate the details of a clutch on the rear or driven axle of the automobile.

In the drawings, A represents the body or box of an automobile, including a necessary frame of such size and form as is adapted for the improved operative mechanism of the automobile. The form and construction of this box or body, including the frame, is not material to my invention, but may be of such form as desired by any one either as a desirable form of manufacture or for the specific object to which it is to be put.

A front axle 2, provided with wheels 3, is placed under the forward portion of the body A and supports the front portion of the body thereon, being connected thereto by means of a fifth-wheel 4 and a king-bolt 5 in such form as is in common use. To enable the user of the automobile to change the direction or course of the moving automobile, means is provided for shifting the forward axle 2 forward or back at either end, as desired, which means consists of an upright rod 6, provided with a hand-wheel 7, which rod 6 is mounted revolubly in a tubular bearing 8, fixed in the bottom of the body of the automobile, and this rod near its lower end is provided with a pulley 9, fixed on the rod, about which runs by one or more turns an axle-shifting cable 10, the ends of which cable are fastened at the right and left, respectively, to the axle 2, conveniently by means of eye-bolts 11.

The automobile is propelled by power actuating mechanism consisting of a spring-motor mounted on the body of the automobile and connected by power-transmitting devices to the rear axles of the automoblie. The two rear wheels 12 12 are fixed each on an axle 13, which axle 13 has its bearings rotatably in a hanger 14, depending from the bottom of the body, at one side thereof, and in a block 15, depending from the bottom of the body at the middle thereof, the two rear axles being axially in alinement. On each of said axles there is a loose sprocket-wheel 16, on which a sprocket-chain 17 runs, which chain therefrom runs to and engages with a sprocket-wheel 18, loose on an axle 19, mounted in members 20 of the body of the automobile. The sprocket-wheel 16 is provided with a laterally-projecting peripheral flange 21, and a disk 22, fixed on the axle 13 alongside of and complementary to the sprocket-wheel 16, is provided with a series of peripheral cams 23, terminating at their inner ends with radially-projecting shoulders 24, the faces of the cams being opposite to and complementary of the flange 21 on the wheel 16. In the space thus formed between the cams 23 and the flange 21 balls 25 are placed, which balls serve as keys to lock the wheel 16 to the disk 22 when the sprocket-wheel is rotated forwardly in the direction indicated by the arrow in Fig. 5. This construction secures the forward rotation of the rear wheel 12 when the sprocket-wheel 16 is rotated forwardly by the action of the sprocket-chain 17 and at the same time provides for the independent rotation of the wheel 12 forwardly, when such independent rotation is desired, by reason of the automobile being driven forward by power applied to one of the rear axles 13, as may occur when the automobile is being turned in its course or as may be desired when the automobile is running ahead with only such small applied power as may be conveniently applied to one of the axles, leaving the other axle and its wheel to rotate forwardly freely.

For driving the axles 13 independently of each other suitable heavy springs 26 are employed, one spirng for each axle, these springs being severally secured at their inner ends to the hubs of the disk 27, mounted loose on the axle 19, adjacent to and concentrically with the sprocket-wheels 18. The outer ends of each of these springs 26, which are preferably flat steel springs, are secured to stud-pins 28, fixed in the sprocket-wheels 18. Pawls 29 in the form of eccentrics, pivoted in blocks therefor on the body of the frame, engage peripherally the disks 27 and prevent them severally from rotating rearwardly, but permit them to rotate forwardly freely in the direction of the arrow on Fig. 3.

Adjacent to each disk 27 there is a small drum 30, loose on the axle 19, which drum is provided interiorly with a pawl 31, arranged to engage ratchet-teeth 32, formed on the exterior surface of the disk 27, whereby when the drum 30 is rotated in one direction it compels the rotation of the disk 27 in the same direction, this motion being employed in winding up the spring 26, but permits free revolution of the disk 27 in the other direction. The pawl 31 is held yieldingly to its work by a spring 33. A strap 34, secured at its rear end to the periphery of the drum 30, winds thereon, advisably to the extent of one turn thereabout, and this strap is secured at its other end to the rear end of one arm of a bell-crank hand-lever 35. These hand-levers 35 are so disposed that they are readily grasped by the boy or person occupying the seat on the body of the automobile, and by working the levers back and forth the actuating-springs 26 can be wound up so as to be in condition for furnishing the necessary power to run the automobile ahead when desired. A spring 36, one in connection with each drum 30, is anchored at one end in a member 20 of the body and being coiled about the axle 19 bears at its free end against a pin 37. fixed in the drum 30, and is adapted to return the drum to initial position when by the pulling of the lever 35 rearwardly the drum has been rotated to such extent as to unwind the strap 34 therefrom.

The sprocket-wheels 18 are held initially in non-revoluble position by suitable brakes therefor, consisting of brake-blocks 38, fixed in the extremities of the rear arms of medially-pivoted brake-levers 39, the brake-levers being pivoted on the frame of the body and being turned up and somewhat flattened at their front ends, forming foot-pedals 40, located just above the bottom of the box and in front of the seat, so as to be adapted to be readily operated by the user of the automobile. The user of the automobile by bearing down on the pedals of one or both of these brake-levers can release the sprocket-wheels 18, so that these wheels being actuated by the springs 26 will rotate forwardly. The brake-blocks 38 bear against peripheral flanges on the sprocket-wheels 18. The brake-blocks 38 are held yieldingly against the sprocket-wheels 18 by springs 41, fixed to the body and bearing against the brake-blocks.

A rear-wheel brake is provided, consisting of a shoe 42, fixed on one arm of the bell-crank brake-lever 43, the shoe being adapted to bear against the perimeter of the wheel 12. The bell-crank lever 43 is mounted medially in a bearing therefor on the body and at its front extremity is provided with a pedal 44, located above the bottom of the box and in front of the seat, so as to be conveniently accessible by a person occupying the seat of the automobile. The brake 42 is held yieldingly in non-active position by a spring 45, connected to the lever 43 and anchored to the body A.

What I claim as my invention is—

1. In an automobile, a body, a driven axle and its wheel, a sprocket-chain running on the axle and on a driving sprocket-wheel, said sprocket-wheel, a disk alongside the sprocket-wheel, a coiled spring anchored at one end to the disk and at the other end to the sprocket-wheel, means for holding the sprocket-wheel releasably against rotation, means for preventing the disk from rotating rearwardly, and means for winding up the spring.

2. In an automobile, a driven axle and its wheel, a sprocket-chain running on the axle and on a driving sprocket-wheel, said sprocket-wheel, a disk alongside the sprocket-wheel, a coiled spring anchored at one end to the disk and at the other end to the sprocket-wheel, means for holding the sprocket-wheel releasably against rotation, a drum alongside the disk, a pawl on the drum, ratchet-teeth on the disk adapted to be engaged in one direction by the pawl, and means for rotating the drum.

3. In an automobile, a driven axle and its wheel, a sprocket-chain running on the axle and on a driving sprocket-wheel, said sprocket-wheel, a disk alongside the sprocket-wheel, a coiled spring anchored at one end to the disk and at the other end to the sprocket-wheel, means for holding the sprocket-wheel releasably against rotation, means for preventing the disk from rotating rearwardly, a drum alongside the disk, a pawl on the drum, ratchet-teeth on the disk adapted to be engaged in one direction by the pawl, a strap secured to and winding on the drum, a lever-handle to which the strap is connected, and a spring adapted to return the drum to initial position.

4. In an automobile, a wheel-driving motor, comprising a rotatable driving-wheel, means for locking the wheel releasably against rotation, a disk alongside and concentric with the wheel, a coiled spring anchored at one end to the disk and at its other end secured to the wheel, a pawl engaging the disk and permitting rotation of the disk in one direction only, a drum adjacent to and connected with the disk, a pawl on the drum, ratchet-teeth on the disk engaged by the pawl, a strap attached to and running on the drum, means for pulling on the strap, and a spring for returning the drum to initial position.

5. In an automobile, a sprocket driving-wheel, means for rotating the wheel, a brake for locking the wheel releasably consisting of a bell-crank lever one arm of which terminates in a foot-pedal, a brake-block on the other arm of the lever, and a spring adapted to hold the brake-block releasably in contact with the wheel.

In testimony whereof I affix my signature in presence of two witnesses.

GAYLORD H. BROWNE.

Witnesses:
ALFRED M. CHRISTIAN,
DENNIS J. McSWEENEY.